(12) United States Patent
Hopperstad et al.

(10) Patent No.: US 7,321,527 B2
(45) Date of Patent: Jan. 22, 2008

(54) METHOD AND APPARATUS FOR CONTROLLING THE ACOUSTIC OUTPUT OF AN AIRGUN

(75) Inventors: Jon-Fredrik Hopperstad, Petersfield (GB); Johan-Fredrik Synnevaag, Oslo (NO); Anneli Soppi, Svanesund (SE)

(73) Assignee: WesternGeco, L.L.C., Houston, TX (US)

(*) Notice: Subject to any disclaimer, the term of this patent is extended or adjusted under 35 U.S.C. 154(b) by 235 days.

(21) Appl. No.: 11/219,273

(22) Filed: Sep. 2, 2005

(65) Prior Publication Data

US 2006/0050614 A1 Mar. 9, 2006

Related U.S. Application Data

(60) Provisional application No. 60/607,977, filed on Sep. 8, 2004.

(51) Int. Cl.
*G01V 1/37* (2006.01)

(52) U.S. Cl. ...................................................... 367/144
(58) Field of Classification Search ................ 367/144; 181/120
See application file for complete search history.

(56) References Cited

U.S. PATENT DOCUMENTS

| 3,837,424 | A | 9/1974 | Itria |
| 4,712,202 | A | 12/1987 | Chelminski |
| 4,921,068 | A | 5/1990 | Pascouet |
| 6,260,657 | B1 | 7/2001 | Arnold et al. |
| 2006/0050614 | A1* | 3/2006 | Hopperstad et al. ........ 367/144 |

FOREIGN PATENT DOCUMENTS

GB 2429777 * 3/2007

OTHER PUBLICATIONS

A. Ziolkowski, "*Measurement of air-gun bubble oscillations*", Geophysics, Dec. 1998, 63, 2009-2024.
A. J. Berkhout, *Seismic Migration: Imaging Acoustic Energy by Wavefield Extrapolation, A, Theoretical Aspects*, p. 121, Elsevier, 1982.
UK Search Report dated Jul. 12, 2006, for Application No. GB 0606455.4.

* cited by examiner

*Primary Examiner*—Dan Pihulic
(74) *Attorney, Agent, or Firm*—Ari Pramudji; Liangang (Mark) Ye; Jeffery E. Griffin

(57) ABSTRACT

A device including a housing defining a first chamber and a port formed through the housing. A shuttle flange moveably positioned within the first chamber. The shuttle flange moves during a gas-release cycle between i) a closed position blocking the port, and ii) an open position exposing an exit area of the port through which a compressed gas is discharged. A method for generating a seismic pressure pulse in water includes the steps of, confining a compressed gas within a chamber having a port, creating an exit area through the port by moving a shuttle along the length of the port during a gas-release cycle, pre-releasing a charge of the compressed gas through the exit area to create a pre-released bubble, choking the exit area, and producing a primary pressure pulse by releasing a main charge of compressed gas through the exit area.

41 Claims, 7 Drawing Sheets

METHOD AND APPARATUS FOR CONTROLLING THE ACOUSTIC OUTPUT OF AN AIRGUN

RELATED APPLICATIONS

This application claims the benefit of U.S. Provisional Patent Application No. 60/607,977 filed Sep. 8, 2004.

FIELD OF THE INVENTION

The present invention relates in general marine seismic exploration and more specifically to controlling the acoustic output of airguns.

BACKGROUND

Airguns are used to generate a pressure signal used in marine seismic exploration. Airguns can be described as a chamber with compressed gas that is released to the surrounding water through port(s). The port is the conduit through which the compressed gas escapes the chamber and enters the surrounding water creating an acoustic pulse. The gas release mechanism is similar in all commercial airguns. The gas release mechanism comprises a chamber closed with a lid (shuttle). The shuttle, while moving during firing the airgun (the gas-release cycle), reveals a port exit area as a function of time.

The prior art airguns and methods of operation emit significant acoustic amplitude outside the frequency range of interest for seismic exploration. The out of band signal is considered noise, and may also adversely affect marine life.

It has been determined that the origin of the high frequency energy is the steep rise in the primary pressure pulse. Commonly, these prior art airguns have a linear rate of exposure of the port exit area during the gas-release cycle. In some prior art methods, a secondary release of pressurized gas is utilized to suppress the bubble oscillation in an effort to reduce the excessive noise.

Accordingly, there is a need to provide an airgun and a method that reduces amplitude of the out of band frequencies emitted. There is a further need to provide a system that reduces the steep rise of the primary pressure pulse.

SUMMARY OF THE INVENTION

A device, for releasing compressed gas to produce an acoustic pulse in the surrounding water, of the present invention is provided. The device includes a housing having an inside diameter defining a first chamber and a port formed through the housing in fluid communication with the first chamber. A shuttle flange, having a diameter, is moveably positioned within the first chamber. The shuttle flange moves during a gas-release cycle between i) a closed position blocking the port containing the compressed gas in the first chamber, and ii) an open position exposing an exit area of the port through which the compressed gas is discharged to produce a primary pressure pulse.

Desirably, the primary pressure pulse produced has an average rising slope less than 2.9 bar-m/ms. The average rising slope of the primary pressure pulse may be in the range of 0.5 to 1.5 bar-m/ms. The average rising slope is calculated at the slope between 10 and 90 percent of the unfiltered signature recorded up to 50 kHz.

The port exit area may be created at a non-linear rate during the gas-release cycle. The port may be non-rectangular. The ratio of the inside diameter to the shuttle flange diameter may vary through the gas-release cycle. The port exit area may be created at a rate less than or equal to 49 square-centimeters-per-millisecond.

The device may further include a second chamber formed by the housing, the second chamber having a first section, an intermediate section, and a second section. An integral flange disposed in the second chamber and connected to the shuttle flange so as to move in unison with the shuttle flange during the gas-release cycle. The diameter may vary along the length of the first section, the intermediate section, and the second section along the length of the shuttle flange's gas-release cycle stroke.

A method, for generating a seismic pressure pulse in water, of the present invention includes the steps of, confining a compressed gas within a chamber having a port, creating an exit area through the port by moving a shuttle along the length of the port during a gas-release cycle, and producing a primary pressure pulse having an average rising slope less than 2.9 bar-m/ms by discharging the gas through the exit area, wherein the average rising slope is calculated at the slope between 10 and 90 percent of the unfiltered signature recorded up to 50 kHz.

The port exit area may be created at a non-linear rate during the gas-release cycle. The port may be non-rectangular. The ratio of the inside diameter to the shuttle flange diameter may vary through the gas-release cycle. The port exit area may be created at a rate less than or equal to 49 square-centimeters-per-millisecond.

The device may further include a second chamber formed by the housing, the second chamber having a first section, an intermediate section, and a second section. An integral flange disposed in the second chamber and connected to the shuttle flange so as to move in unison with the shuttle flange during the gas-release cycle. The diameter may vary along the length of the first section, the intermediate section, and the second section along the length of the shuttle flange's gas-release cycle stroke.

Another method, for generating a seismic pressure pulse in water, of the present invention includes the steps of, confining a compressed gas within a chamber having a port, creating an exit area through the port by moving a shuttle along the length of the port during a gas-release cycle, pre-releasing a charge of the compressed gas through the exit area to create a pre-released bubble, choking the exit area, and producing a primary pressure pulse by releasing a main charge of compressed gas through the exit area. The primary pressure pulse may be created approximately at the maximum volume of the pre-released bubble. The primary pressure pulse may be created at approximately half of the bubble period of the pre-released gas bubble.

Desirably, the primary pressure pulse produced has an average rising slope less than 2.9 bar-m/ms. The average rising slope of the primary pressure pulse may be in the range of 0.5 to 1.5 bar-m/ms. The average rising slope is calculated at the slope between 10 and 90 percent of the unfiltered signature recorded up to 50 kHz.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Refer now to the drawings wherein depicted elements are not necessarily shown to scale and wherein like or similar elements are designated by the same reference numeral through the several views.

Figure 1A:
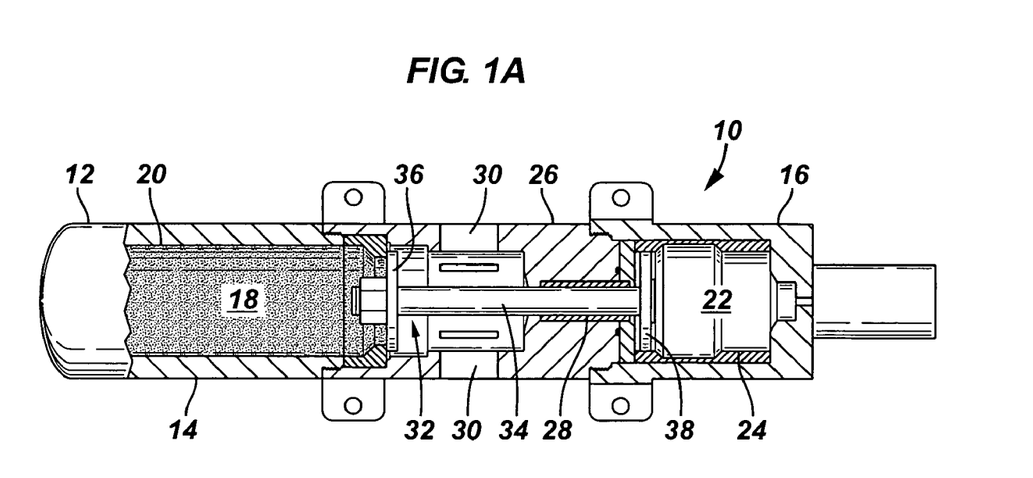
FIG. 1A is a cross-sectional view of an embodiment of an airgun of the present invention shown in the closed position.
Figure 1B:
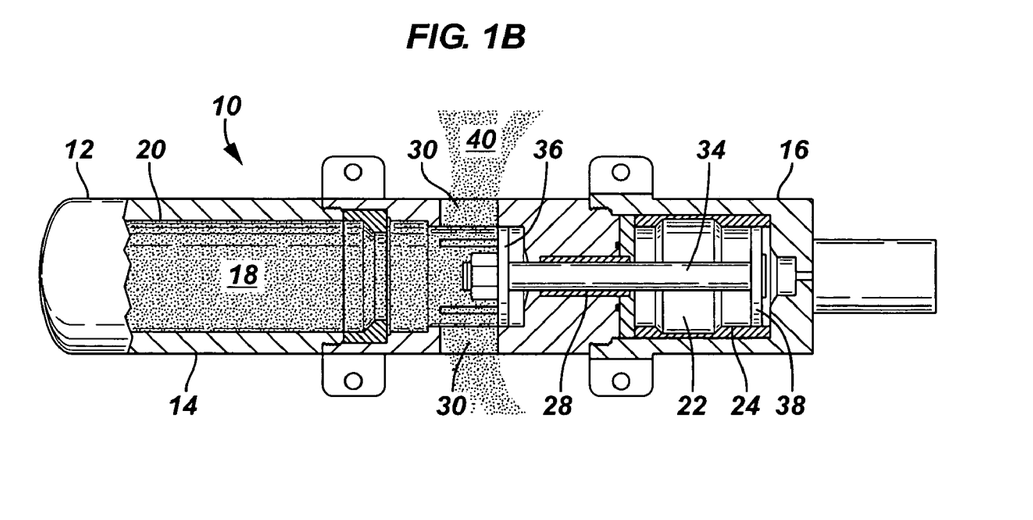
FIG. 1B is a cross-sectional view of the airgun of FIG. 1A shown in the open position during the gas-release cycle.

FIG. 1A is a cross-sectional view of an embodiment of an airgun of the present invention, generally designated by the numeral 10, shown in the closed position. For purposes of illustration, airgun 10 of FIG. 1A and 1B is shown as a Bolt 1500 airgun. Airgun 10 comprises a housing 12 and a lid or shuttle 32 for controlling the release of a compressed gas from housing 12 to create an acoustic output.

Housing 12 includes a main housing section 14 and a top housing section 16. Main housing section 14 forms a fire chamber 18 having a fire chamber liner 20. Top housing section 16 forms an operating chamber 22 having an operating chamber liner 24. Fire chamber 18 and operating chamber 22 are separated by a chamber wall 26. A substantially centered bore 28 is formed through wall 26 connecting fire chamber 18 and operating chamber 22. A port or ports 30 are formed through main housing 14 providing fluid communication between fire chamber 18 and the exterior of airgun 10.

Shuttle 32 includes a shaft 34 carrying a shuttle flange 36 proximate its first end and an integral flange 38 carried proximate its second end. Shuttle 32 is moveably disposed in housing 12 with shaft 34 disposed in bore 28, shuttle flange 36 is disposed in fire chamber 18, and integral flange 38 is disposed in operating chamber 22.

Airguns are pressure-balanced devices, the movement of the shuttle is provided by the pressure differences on its opposing flanges. The shuttle, while moving during firing of the airgun, reveals a port exit area as a function of time. In the prior art airguns, the port exit area is a linear function of the shuttle position over the gas-release cycle. An aspect of the present invention it to control the frequency of the acoustic output by mechanically controlling the port exit area revealed as a function of time.

FIG. 1B is a cross-sectional view of airgun 10 of FIG. 1A shown in the open position, venting pressurized gas 40 from fire chamber 18 through ports 30. When compressed gas 40 escapes from airgun 10 into the surrounding water an acoustic pulse is created.

Figure 2A:
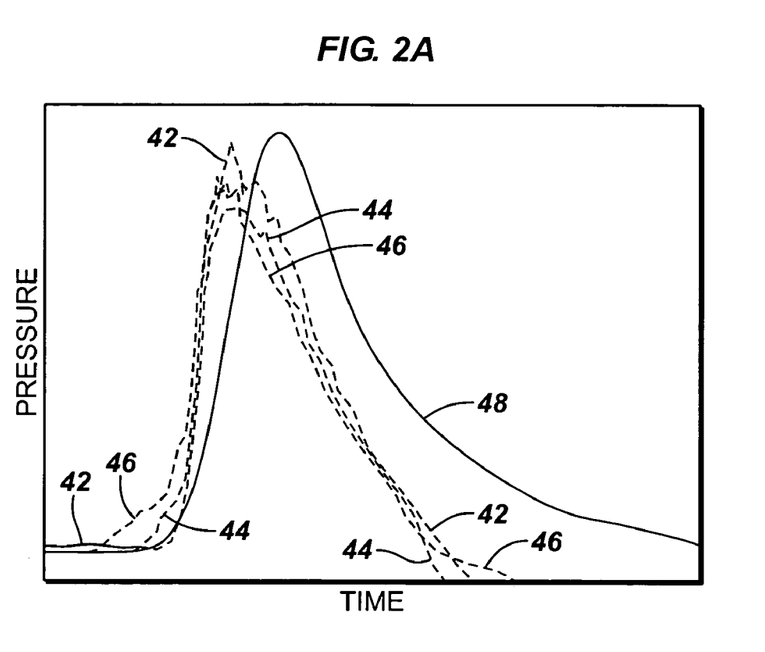
FIG. 2A is a graphical illustration of the desired primary pressure pulse shape compared to examples of conventional primary pressure pulse shapes of prior art airguns.

FIG. 2A is a graphical illustration of a desired airgun primary pressure pulse shape of the present invention compared to examples of conventional primary pressure pulse shapes of prior art airguns. Conventional airguns emit significant amplitude outside the frequency range of interest for seismic exploration. FIG. 2A shows the primary pressure pulse shape of three prior art commercial airguns as dashed lines. Curve 42 is a primary pressure pulse for a prior art I/O sleeve airgun. Curve 44 is a primary pressure pulse for a prior art Bolt airgun. Curve 46 is a primary pressure pulse for a prior art Sodera airgun. Curve 48 is desired pressure pulse shape of the present invention.

Figure 2B:
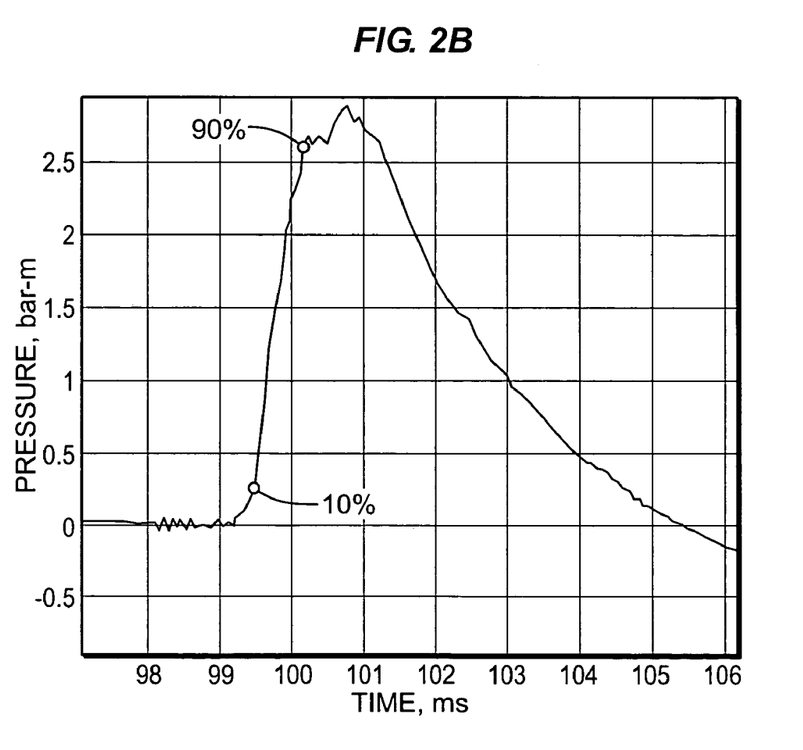
FIG. 2B is a graphical illustration of calculating the average rising slope of a primary pressure pulse.

FIG. 2B is a graphical illustration of calculating the average rising slope of a primary pressure pulse. The average rising slope of the pressure pulse is calculated as the slope between 10 percent and 90 percent of the rising primary pulse of the unfiltered signature recorded up to 50 kHz.

With reference to FIGS. 2A and 2B, the prior art commercial airguns investigated by Applicant have an average rising slope greater than 2.9 bar-m/ms. Primary pressure pulse 48 of the present method has an average rising slope less than 2.9 bar-m/ms. Desirably, the primary pressure pulse 48 of the present invention has an average rising slope in the interval of 0.5 to 1.5 bar-m/ms.

Figure 3:
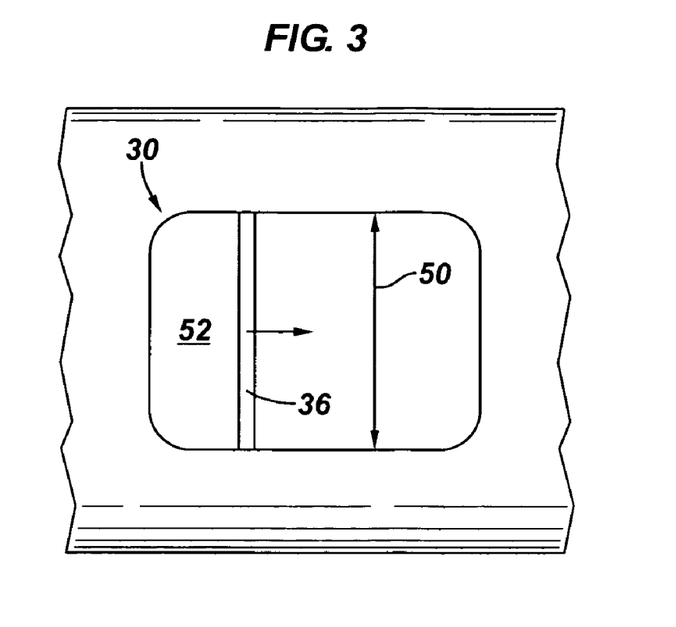
FIG. 3 is an illustration of a port during firing of an airgun.

FIG. 3 is an illustration of a port 30 during firing of an airgun. Shuttle flange 36 moves in the direction shown by the arrow, revealing a gas exit area 52. Port 30 has a constant width 50 along its length in the prior art airguns. In the prior art airguns, gas exit area 52 is a linear function of shuttle position.

Figure 4:
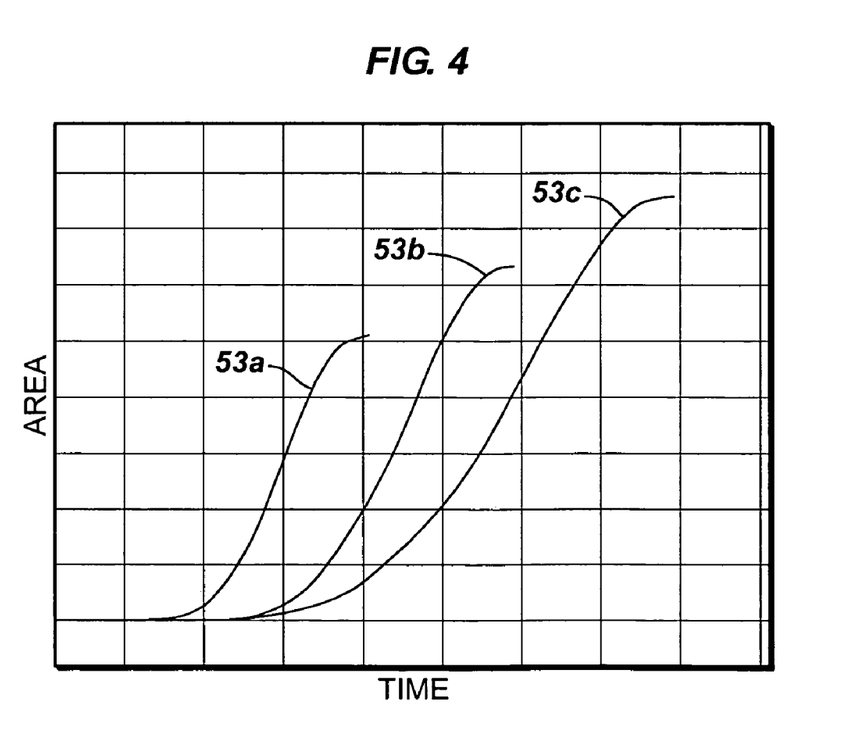
FIG. 4 is an illustration of desired port exit area functions over time for a desired primary pressure pulse shape.

FIG. 4 is an illustration of desired exit area 52 (FIG. 3) over time functions 53 for a desired primary pressure pulse shape 48 (FIG. 2A). Exit area functions 53a, 53b, 53c are shown for desired airgun pulses with different slopes and thereby different frequency content. The desired port exit area functions 53 are non-linear. Ports 30 are characterized by a slow increase in exit area 52 at the start of the gas-release to achieve a smooth transition from zero to peak of the primary airgun pressure pulse 48 (FIG. 2A). The slope and the maximum of port exit area 52 depends on the desired high-cut frequency and amplitude of the airgun pulse. The shape of the port exit area function 53 will also depend on the total volume of the gas-release chamber 18, 22 (FIGS. 1A, 1B), as the pressure drop is different for different chambers (see description for FIG. 9).

Referring to FIGS. 1 through 4, to suppress the transmission of higher frequencies, a slow increase in port exit area 52 as a function of time is required. The increase in port exit area 52 is dependent on the movement of shuttle flange 36 across port 30. The rate of change of the port exit area can be affected by: i) changing the shape of port 30, by modifying the geometric shape of the port (FIG. 7), and/or altering the port exit area start (FIG. 8), and/or ii) modifying the velocity profile of shuttle 32 (FIG. 9) through the gas-release cycle.

Figure 5:
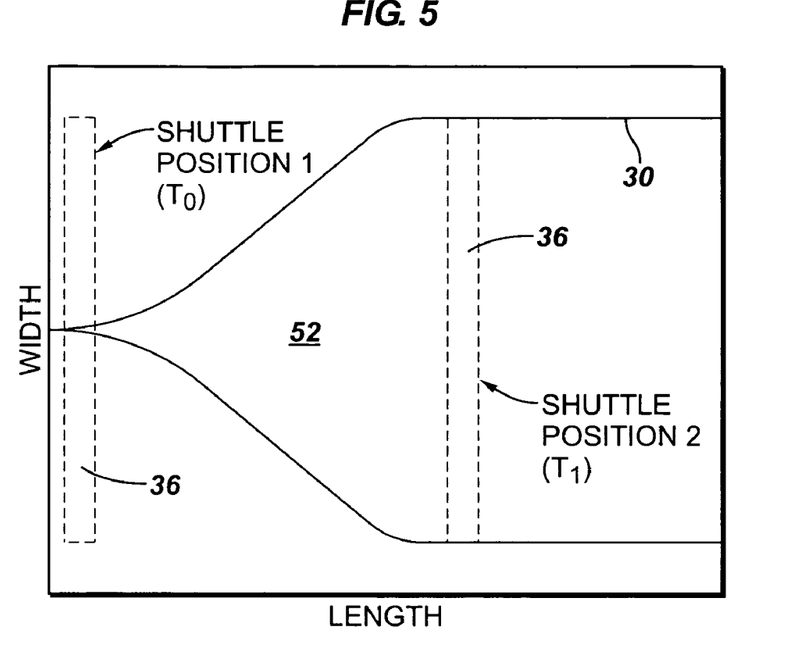
FIG. 5 illustrates the time interval in which the rate of change of the port exit area is measured.

In a desired airgun 10 and method of the present invention, the desired rate of exposing the exit area 52 of port 30 is less than or equal to 49 $cm^2$/ms. FIG. 5 illustrates the time interval in which the rate of change of port exit area 52 is measured. The rate of increase in port exit area 52 is measured from a first time, "shuttle position 1," wherein shuttle flange 36 is positioned at the start of port exit opening 80 (see FIG. 8), to a second time, "shuttle position 2," wherein a 50 cm$^2$ port exit area 52 is exposed.

Figure 6:
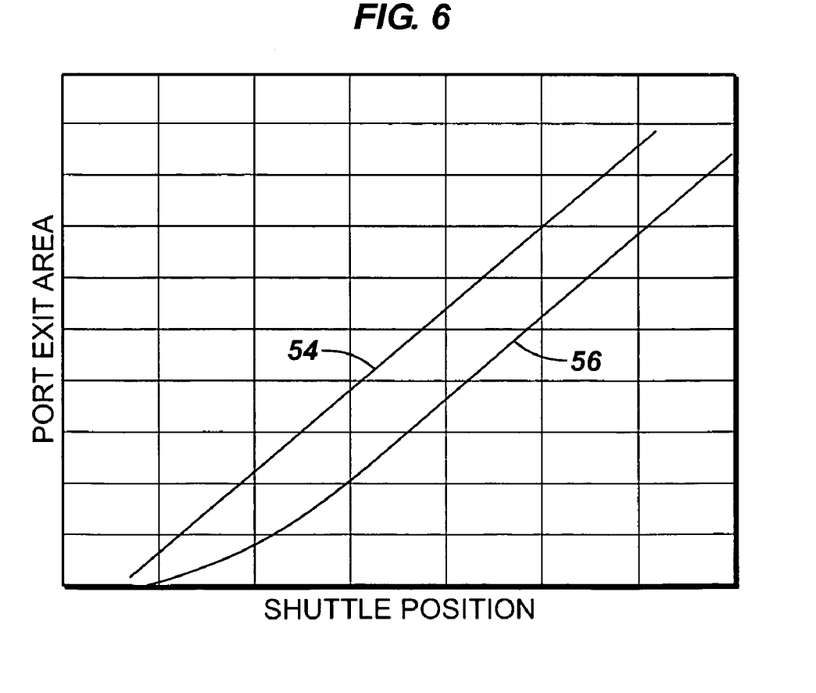
FIG. 6 illustrates a desired rate of change of port exit area as a function of the shuttle flange position.

FIG. 6 illustrates a desired rate of change of port exit area 52 as a function of shuttle flange 36 position. The Y-axis shows the port exit area 52 (FIG. 5). The X-axis shows the position of shuttle flange 36 (FIG. 5) throughout gas-release cycle. The dashed line 54 illustrates the linear rate of change of port exit area 52, as a function of shuttle flange 36 position, of a prior art Bolt 1500 airgun. Curve 56 illustrates the rate of change port exit area 52 as a function of shuttle flange 36 position of a inventive, modified Bolt 1500 airgun. The inventive method and apparatus has a non-linear rate of change of port exit 52 as a function of shuttle flange 36 position.

Figure 7:
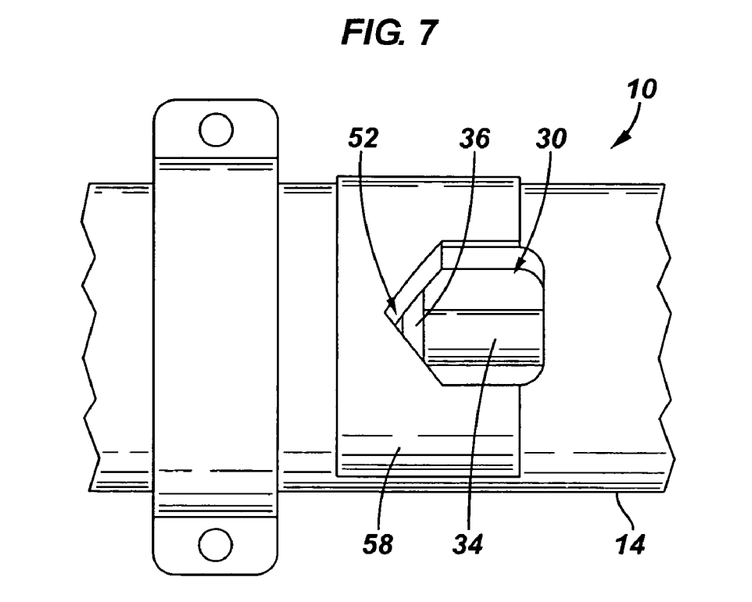
FIG. 7 is an illustration of an embodiment of an airgun of the present invention.

FIG. 7 is an illustration of an embodiment of an airgun 10 of the present invention. Airgun 10 shown in FIG. 7 is a prior art Bolt 1500 having a port insert 58 modifying the profile, or geometric shape of the periphery, of port 30. In the prior art airguns port 30 is rectangular in shape. As shown, modified port 30 has varying diameters across the length of modified port 30. The varying diameter of port 30 along its length results in a non-linear rate of change of the area of port exit 52 as a function of the position of shuttle flange 36.

Port inserts 58 may be positioned in each of the ports 30 of airgun 10, or in one or more of ports 30. Inserts 58 may be connected to main housing 14 by bolts or other connecting mechanism as are well known in the art. The shape of port 30 may be manufactured in main housing 14 as opposed to adding inserts 58. Inserts 58 allow manipulation of the shape of port 30 as desired.

Figure 8:
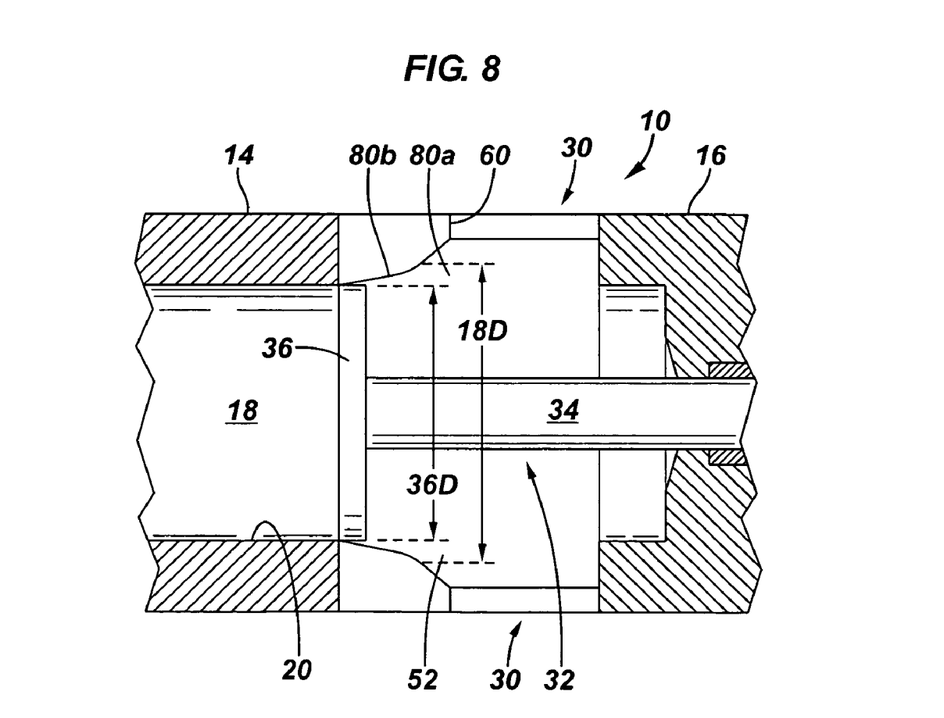
FIG. 8 is a partial, cut-away view of another embodiment of an airgun of the present invention.

FIG. 8 is a partial, cut-away view of another embodiment of an airgun 10 of the present invention. Shuttle flange 36 is shown positioned within fire chamber 18 in a closed position, wherein gas in fire chamber 18 is not discharged through exit area 52 of port 30. Shuttle flange 36 has a diameter 36D. Fire chamber 18 has an inside diameter 18D. In the prior art airguns, the inside diameter of fire chamber 18D is constant, as illustrated by the dashed line, along the length of shuttle's 32 gas-release cycle stroke. Thus, in the prior art airguns the ratio of the fire chamber diameter 18D and shuttle flange diameter 36D is constant, and when port 30 is rectangular the rate change of port exit area 52 is linear in relation to the position of shuttle flange 36 during the gas-release cycle. Release of gas begins when shuttle flange 36, is positioned proximate edge 60 of port 30, referred to as the start of the port exit opening 80a.

In the embodiment of the present invention, fire chamber diameter 18D increases as it approaches the edge 60 of port 30. In the present embodiment, the ratio of fire chamber diameter 18D and shuttle flange diameter 36D is not constant along the length of shuttle's 32 gas-release cycle stroke. The increasing divergence of shuttle flange 36 from the inside wall, or liner 20, of fire chamber 18 results in a non-linear rate of change of port exit area 52 through the gas-release movement of shuttle 32. By varying the diameter of fire chamber 18D, the start of port exit opening 80b is positioned where flange 36 diverges from liner 20.

Figure 9:
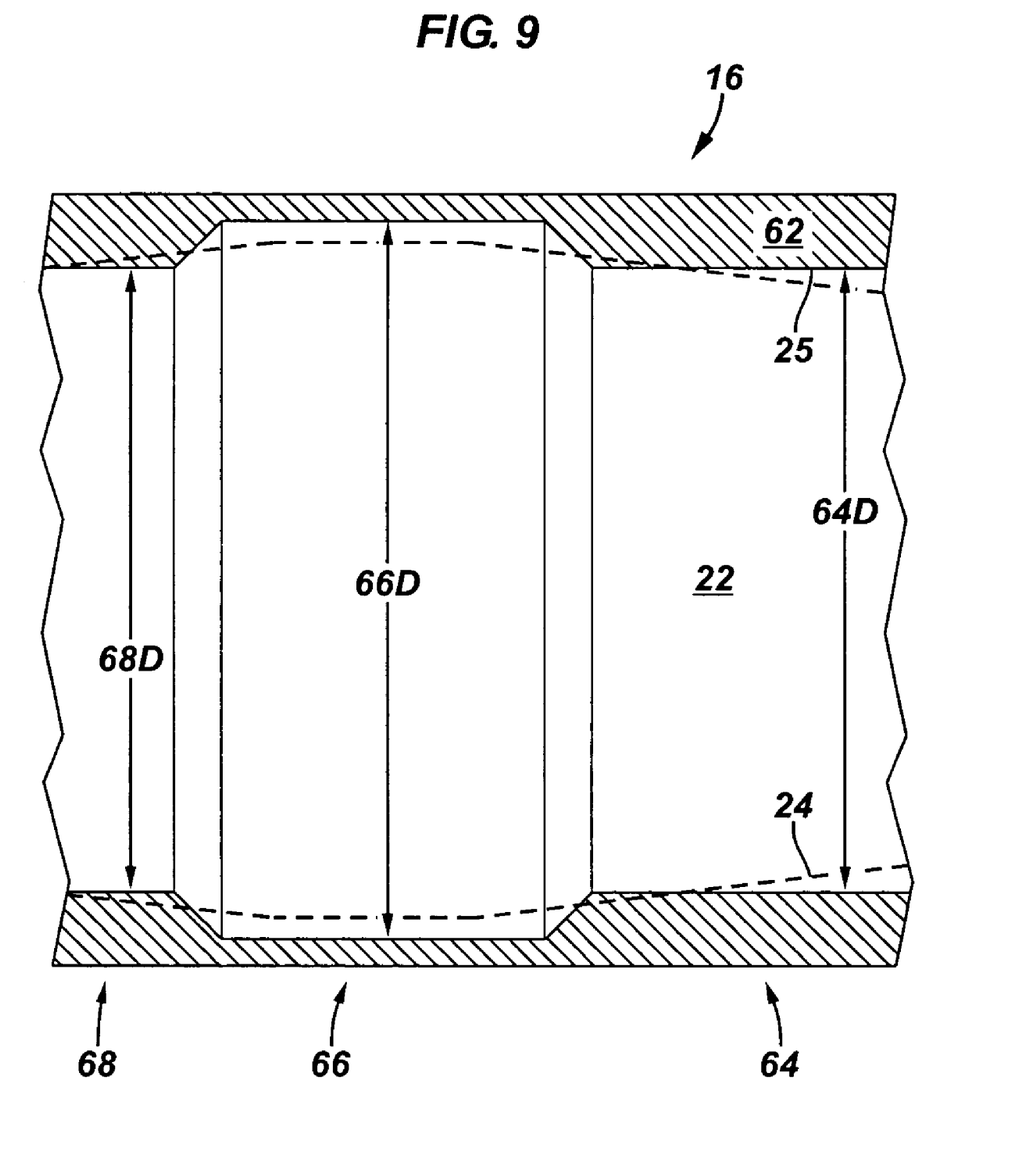
FIG. 9 is a partial, cross-sectional view of an embodiment of the top housing of present invention.

FIG. 9 is a partial, cross-sectional view of top housing 16 of another embodiment of the present invention. With reference to FIG. 1B, integral flange 38 moves along the inside wall, or operating chamber liner 24, of operating chamber 22. The area of integral flange 38 and shuttle flange 36 exposed to gas pressure, controls the speed of travel of shuttle 32 during the gas-release cycle and thereby the port exit area 52 as a function of time (FIG. 4).

Operating chamber 22 includes a first end section 64 having a diameter 64D, intermediate section 66 having a diameter 66D, and a second end section 68 having a diameter 68D. The cross-hatched portion 62 illustrates a conventional, prior art, operational chamber liner 25. Diameters 64D, 66D, and 68D are constant in the prior art airguns. The constant diameter along each the length of each section 64, 66, 68, considering the change in pressure acting on flange 36 during the gas-release cycle, results in a linear creation of the port exit area.

An embodiment of a liner 24 of the present invention is provided, superimposed on the prior art liner 25, illustrating that the profile of liner 24 is not constant for 64D, 66D, and 68D. The non-constant, or varying, diameter along the length of each section 64, 66, 68, considering the change of pressure acting on the shuttle flange during the gas-release cycle, results in a non-linear creation of the port exit area during the gas-release cycle.

In the embodiment of FIG. 9, the port exit area revealed over time or as a function of the shuttle position during the gas-release cycle, is manipulated by controlling the velocity of shuttle 32 (FIG. 1B). The port exit area function may be controlled by modifying the geometric shape of the periphery of port 30 (FIG. 7), and/or effectively modifying the port exit area by adjusting the port exit opening position 80b (FIG. 8), and/or by controlling the velocity of the shuttle (FIG. 9).

Another embodiment of the present invention is described with reference to FIGS. 10 and 11. It is generally known that the monopole acoustic signature of a spherical airgun bubble may be a linear function of the volume acceleration of the released gas. The desired primary pressure pulse 48 (FIG. 2A), may be achieved by releasing a small amount of gas a few milliseconds before the main gas release that produces the main or primary pressure pulse and bubble. This dynamic pre-released gas will rapidly expand due to the high pressure of the released gas, but the bubble pressure level will drop correspondingly as the gas release is cut off or significantly choked. At the time of the main gas release, the high-pressure gas will be released into the low-pressure bubble resulting in reduced volume acceleration for the main gas release and bubble.

Prior art airguns tend to have a small amount of gas that escapes that creates a tiny pre-released bubble. However, this leaked gas pressure is not intended or controlled, and does not produce the desired pressure pulse 48 (FIG. 2A). Additionally, in prior art methods, the initial charge of gas generates the primary pulse and the second charge suppresses the secondary bubble oscillations. In the present invention, the initial charge of gas is released before the primary pressure pulse is generated by the second charge of gas released.

Figure 10:
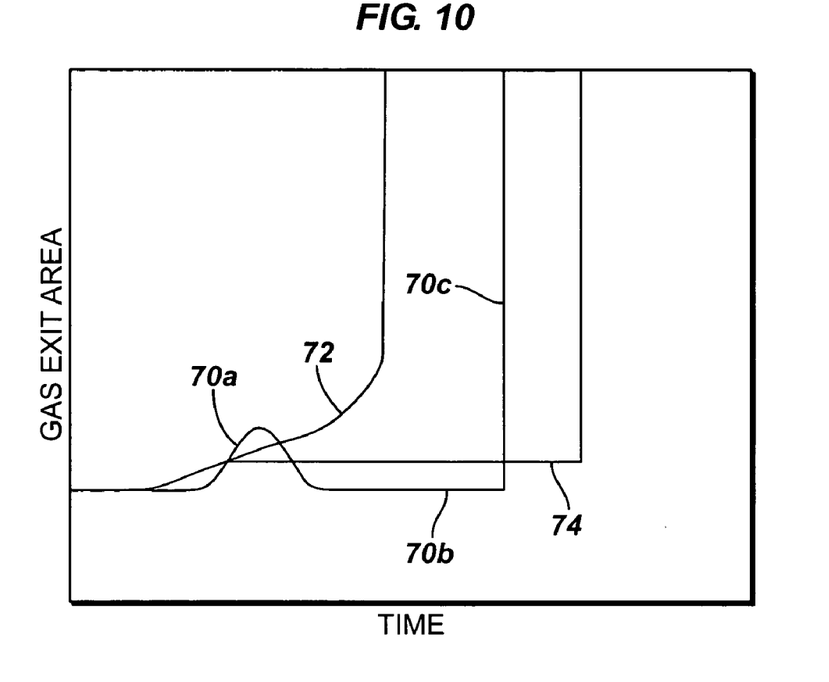
FIG. 10 is a graphical illustration of dynamic pre-release of gas of the present invention.

FIG. 10 is a graphical illustration of dynamic pre-release of gas of the present invention. Curve 70 illustrates the gas exit area as a function of time for the dynamic pre-release of gas method of the present invention. Gas is pre-released at 70a creating a bubble. The gas exit area is then choked, or reduced, at 70b. Then the primary pressure pulse is created by the main gas release at 70c. Curve 72 illustrates a typical prior art airgun having increasing leakage. Curve 74 illustrates constant leakage of the prior art airgun systems and methods. The main gas release for each curve is illustrated at the steep, vertical, slopes.

Figure 11:
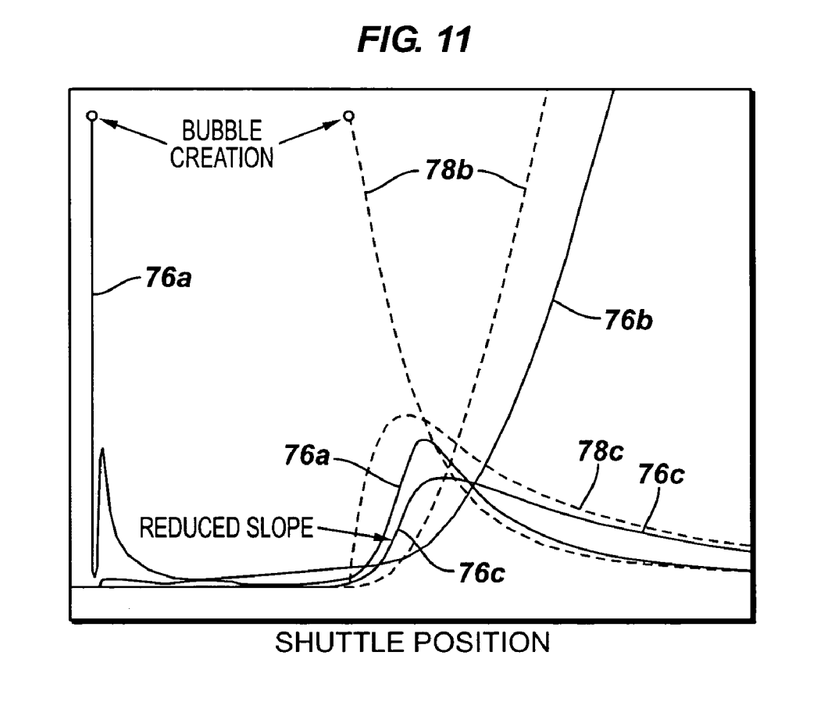
FIG. 11 is a graphical illustration of the effects of a dynamic pre-release of gas of the present invention.

FIG. 11 is a graphical illustration of the effects of a dynamic pre-release gas of the present invention on bubble dynamics. Curves 76 (solid lines) represent the bubble dynamics of the method of the present invention. Curves 78 (dashed lines) represent the bubble dynamics of prior art methods. Curves 76a and 78a show the bubble pressure over time. Curves 76b and 78b show the bubble volume over time. Curves 76c and 78c show the acoustic pressure over time. In the method of the present invention, at the time of the creation of the primary acoustic pulse, the pressure in the pre-released bubble is low (76a) compared with the bubble created directly. The primary acoustic pulse of the pre-released bubble will be lower in amplitude and slope (76c) than the prior art methods (78c).

In the present method, the creation of the pre-released bubble and the start of the main release should be approximately half of the bubble period of the pre-bubble, or a multiple of the half period, such that the main gas release starts at maximum volume of the pre-released bubble.

From the foregoing detailed description of specific embodiments of the invention, it should be apparent that a system for controlling the acoustic output of an airgun that is novel and unobvious has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including, but not limited to, those implementation variations which may have been suggested herein, may be made to the disclosed embodiments without departing from the spirit and scope of the invention as defined by the appended claims which follow.

What is claimed is:

1. A device for releasing compressed gas to produce an acoustic pulse in water, the device comprising:
    a housing having an inside diameter defining a first chamber;
    a port formed through the housing in fluid communication with the first chamber; and
    a shuttle flange having a diameter, the shuttle flange moveably positioned within the first chamber during a gas-release cycle between a closed position blocking the port containing the compressed gas in the first chamber to an open position exposing an exit area of the port through which the compressed gas is discharged to produce a primary pressure pulse:
    wherein the port exit area is created through the gas-release cycle at a non-linear rate.

2. The device of claim 1, wherein the port is non-rectangular.

3. The device of claim 1, wherein the ratio of the inside diameter to the shuttle flange diameter is not constant through the gas-release cycle.

4. The device of claim 1, wherein the port exit area is created at a rate less than or equal to 49 square-centimeters-per-millisecond.

5. The device of claim 2, wherein the port exit area is created at a rate less than or equal to 49 square-centimeters-per-millisecond.

6. The device of claim 3, wherein the port exit area is created at a rate less than or equal to 49 square-centimeters-per-millisecond.

7. The device of claim 1, further including:
    a second chamber formed by the housing, the second chamber having a first section, an intermediate section, and a second section; and
    an integral flange disposed in the second chamber and connected to the shuttle flange so as to move in unison with the shuttle flange during the gas-release cycle:
    wherein the diameter varies along the length of the first section, the diameter varies along the length of the intermediate section, and the diameter varies along the length of the second section.

8. The device of claim 2, further including:
    a second chamber formed by the housing, the second chamber having a first section, an intermediate section, and a second section; and
    an integral flange disposed in the second chamber and connected to the shuttle flange so as to move in unison with the shuttle flange during the gas-release cycle:
    wherein the diameter varies along the length of the first section, the diameter varies along the length of the intermediate section, and the diameter varies along the length of the second section.

9. The device of claim 3, further including:
    a second chamber formed by the housing, the second chamber having a first section, an intermediate section, and a second section; and
    an integral flange disposed in the second chamber and connected to the shuttle flange so as to move in unison with the shuttle flange during the gas-release cycle:
    wherein the diameter varies along the length of the first section, the diameter varies along the length of the intermediate section, and the diameter varies along the length of the second section.

10. The device of claim 7, wherein the port exit area is created at a rate less than or equal to 49 square-centimeters-per-millisecond.

11. The device of claim 8, wherein the port exit area is created at a rate less than or equal to 49 square-centimeters-per-millisecond.

12. The device of claim 9, wherein the port exit area is created at a rate less than or equal to 49 square-centimeters-per-millisecond.

13. A device for releasing compressed gas to produce an acoustic pulse in water, the device comprising:
    a housing having an inside diameter defining a first chamber;
    a port formed through the housing in fluid communication with the first chamber; and
    a shuttle flange having a diameter, the shuttle flange moveably positioned within the first chamber during a gas-release cycle between a closed position blocking the port containing the compressed gas in the first chamber to an open position exposing an exit area of the port through which the compressed gas is discharged to produce a primary pressure pulse having an average rising slope less than 2.9 bar-m/ms:
    wherein the average rising slope is calculated at the slope between 10 and 90 percent of an unfiltered signature recorded up to 50 kHz.

14. The device of claim 13, wherein the average rising slope of the primary pressure pulse is in the range of 0.5 bar-m/ms to 1.5 bar-m/ms.

15. The device of claim 13, wherein port exit area is created through the gas-release cycle at a non-linear rate.

16. The device of claim 13, wherein the port is non-rectangular.

17. The device of claim 13, wherein the ratio of the inside diameter to the shuttle flange diameter is not constant through the gas-release cycle.

18. The device of claim 16, wherein the ratio of the inside diameter to the shuttle flange diameter is not constant through the gas-release cycle.

19. The device of claim 13, wherein the port exit area is created through the gas-release cycle at a rate less than or equal to 49 square-centimeters-per-millisecond.

20. The device of claim 16, wherein the port exit area is created through the gas-release cycle at a rate less than or equal to 49 square-centimeters-per-millisecond.

21. The device of claim 17, wherein the port exit area is created through the gas-release cycle at a rate less than or equal to 49 square-centimeters-per-millisecond.

22. The device of claim 13, further including:
a second chamber formed by the housing, the second chamber having a first section, an intermediate section, and a second section; and
an integral flange disposed in the second chamber and connected to the shuttle flange so as to move in unison with the shuttle flange during the gas-release cycle:
wherein the diameter varies along the length of the first section, the diameter varies along the length of the intermediate section, and the diameter varies along the length of the second section.

23. The device of claim 16, further including:
a second chamber formed by the housing, the second chamber having a first section, an intermediate section, and a second section; and
an integral flange disposed in the second chamber and connected to the shuttle flange so as to move in unison with the shuttle flange during the gas-release cycle:
wherein the diameter varies along the length of the first section, the diameter varies along the length of the intermediate section, and the diameter varies along the length of the second section.

24. The device of claim 18, further including:
a second chamber formed by the housing, the second chamber having a first section, an intermediate section, and a second section; and
an integral flange disposed in the second chamber and connected to the shuttle flange so as to move in unison with the shuttle flange during the gas-release cycle:
wherein the diameter varies along the length of the first section, the diameter varies along the length of the intermediate section, and the diameter varies along the length of the second section.

25. The device of claim 19, further including:
a second chamber formed by the housing, the second chamber having a first section, an intermediate section, and a second section; and
an integral flange disposed in the second chamber and connected to the shuttle flange so as to move in unison with the shuttle flange during the gas-release cycle:
wherein the diameter varies along the length of the first section, the diameter varies along the length of the intermediate section, and the diameter varies along the length of the second section.

26. A method for generating a seismic pressure pulse in water, the method comprising the steps of:
confining a compressed gas within a chamber having a port;
creating an exit area through the port by moving a shuttle along the length of the port during a gas-release cycle; and
producing a primary pressure pulse by releasing the gas at a non-linear rate through the exit area during the gas-release cycle.

27. A method for generating a seismic pressure pulse in water, the method comprising the steps of:
confining a compressed gas within a chamber having a port;
creating an exit area through the port by moving a shuttle along the length of the port during a gas-release cycle; and
producing a primary pressure pulse by releasing the gas at a non-linear rate through the exit area during the gas-release cycle, wherein an average rising slope of the primary pressure pulse is in the range of 0.5 bar-m/ms to 1.5 bar-m/ms.

28. A method for generating a seismic pressure pulse in water, the method comprising the steps of:
confining a compressed gas within a chamber having a port;
creating an exit area through the port by moving a shuttle along the length of the port during a gas-release cycle; and
producing a primary pressure pulse by releasing the gas at a non-linear rate through the exit area during the gas-release cycle, wherein an average rising slope of the primary pressure pulse is less than 2.9 bar-m/ms by discharging the gas through the exit area, wherein the average rising slope is calculated at the slope between 10 and 90 percent of the unfiltered signature recorded up to 50 kHz.

29. The method of claim 26, wherein the port is non-rectangular.

30. A method for generating a seismic pressure pulse in water, the method comprising the steps of:
confining a compressed gas within a chamber having a port;
creating an exit area through the port by moving a shuttle along the length of the port during a gas-release cycle; and
producing a primary pressure pulse by releasing the gas at a non-linear rate through the exit area during the gas-release cycle, wherein the exit area is created at a rate less than or equal to 49 square-centimeters-per-millisecond.

31. The method of claim 26, wherein the shuttle is positioned in the chamber, and a ratio of a diameter of the shuttle to an inside diameter of the chamber is not constant through the gas-release cycle.

32. A method for generating a seismic pressure pulse in water, the method comprising the steps of:
confining a compressed gas within a chamber having a port;
creating an exit area through the port by moving a shuttle along the length of the port during a gas-release cycle;
pre-releasing a charge of the compressed gas through the exit area to create a pre-released bubble;
choking the exit area; and
producing a primary pressure pulse by releasing a main charge of compressed gas through the exit area.

33. The method of claim 32, wherein the primary pressure pulse has an average rising slope less than 2.9 bar-m/ms by discharging the gas through the exit area, wherein the average rising slope is calculated at the slope between 10 and 90 percent of an unfiltered signature recorded up to 50 kHz.

34. The method of claim 33, wherein the average rising slope of the primary pressure pulse is in the range of 0.5 bar-m/ms to 1.5 bar-m/ms.

35. The method of claim 32, wherein the step of producing the primary pressure pulse starts at approximately the maximum volume of the pre-released bubble.

36. The method of claim 32, wherein the step of producing the primary pressure pulse starts at approximately half of a bubble period of the pre-released gas bubble.

37. The method of claim 35, wherein the primary pressure pulse has an average rising slope less than 2.9 bar-m/ms by discharging the gas through the exit area, wherein the average rising slope is calculated at the slope between 10 and 90 percent of an unfiltered signature recorded up to 50 kHz.

38. The method of claim 36, wherein the primary pressure pulse has an average rising slope less than 2.9 bar-m/ms by discharging the gas through the exit area, wherein the average rising slope is calculated at the slope between 10 and 90 percent of an unfiltered signature recorded up to 50 kHz.

39. The method of claim 32, wherein in the producing step the exit area is created at a non-linear rate through the gas-release cycle.

40. The method of claim 32, wherein in the producing step the exit area is created at a rate less than or equal to 49 square-centimeters-per-millisecond.

41. A device for releasing compressed gas to produce an acoustic pulse in water, the device comprising:
  a housing having an inside diameter defining a first chamber;
  a port formed through the housing in fluid communication with the first chamber;
  and
  a shuttle flange having a diameter, the shuttle flange moveably positioned within the first chamber during a gas-release cycle between a closed position blocking the port containing the compressed gas in the first chamber to an open position exposing an exit area of the port through which the compressed gas is discharged to produce a primary pressure pulse, wherein the ratio of the inside diameter to the shuttle flange diameter is not constant through the gas release cycle.

* * * * *